(12) United States Patent
Havard

(10) Patent No.: US 6,866,008 B1
(45) Date of Patent: Mar. 15, 2005

(54) PET STROLLER

(76) Inventor: Bonnie Pat Havard, P.O. Box 3039, Carlsbad, NM (US) 88221-3039

(*) Notice: Subject to any disclaimer, the term of this patent is extended or adjusted under 35 U.S.C. 154(b) by 0 days.

(21) Appl. No.: 10/368,220

(22) Filed: Feb. 18, 2003

Related U.S. Application Data

(60) Provisional application No. 60/424,599, filed on Nov. 6, 2002.

(51) Int. Cl.$^7$ .................................................. A01K 1/03
(52) U.S. Cl. ..................................... 119/496; 280/47.38
(58) Field of Search ................................. 119/453, 496, 119/497, 498, 500; 280/47.38, 644, 650

(56) References Cited

U.S. PATENT DOCUMENTS

| | | | |
|---|---|---|---|
| 1,741,014 A | * 12/1929 | Debelack | 280/31 |
| 5,113,793 A | 5/1992 | Leader et al. | |
| 5,213,360 A | * 5/1993 | Lin | 280/648 |
| 5,722,594 A | * 3/1998 | Farr et al. | 280/643 |
| 5,810,227 A | 9/1998 | Jorgensen | |
| 6,170,854 B1 | * 1/2001 | Maher et al. | 280/648 |
| 6,224,073 B1 | * 5/2001 | Au | 280/47.38 |
| D445,965 S | 7/2001 | Licciardello | |
| D453,593 S | 2/2002 | Licciardello | |
| 6,374,775 B1 | 4/2002 | Baumsteiger | |
| 2001/0004882 A1 | 6/2001 | Burns et al. | |

\* cited by examiner

*Primary Examiner*—Robert P. Swiatek
(74) *Attorney, Agent, or Firm*—Deborah A. Peacock; Vidal A. Oaxaca; Peacock Myers & Adams, P.C.

(57) ABSTRACT

A light-weight, foldable, soft-sided pet conveyance apparatus. The apparatus provides a soft-sided containment area for securing a pet which can allow a pet to view its surroundings through an optional overhead containment wall access opening or completely secure the pet with a closure flap. The containment area may be used in conjunction with a pre-existing stroller or may be disposed on a stroller frame as a single unit.

17 Claims, 2 Drawing Sheets

PET STROLLER

CROSS-REFERENCE TO RELATED APPLICATIONS

This application claims the benefit of the filing of U.S. Provisional Patent Application Ser. No. 60/424,599, entitled "Pet Stroller", filed on Nov. 6, 2002, and the specification thereof is incorporated herein by reference.

BACKGROUND OF THE INVENTION

1. Field of the Invention (Technical Field)

The present invention relates to conveyance devices for animals, particularly smaller pets.

2. Background Art

Serious pet owners, especially owners of small dogs, cats and the like, have often had a concern about transporting their pets around with them on long walks, in crowded areas, or in areas where it is not safe or accepted for the pet to run about or be walked. Typically, in these type of situations, an owner is forced to carry their pet, often for extended periods of time, causing discomfort, fatigue, and lack of mobility for both the pet and pet owner.

Some prior art devices have attempted to address the problems of transporting a pet in a contained area. One such device is described in U.S. Pat. No. 6,374,775 to Baumsteiger, which discloses a "kennel stroller" wherein a stroller body is provided which is suitable for transporting a pre-existing pet containment device, known in the art as a kennel, or a "travel cage". The conveyance essentially comprises a frame or carrying a hard-bodied, box-shaped structure.

Another prior art device is described in U.S. Pat. No. 5,113,793 to Leader et al. This device comprises a wheeled conveyance which supports a large, box-shaped structure, which in this case, comprises a cage device.

U.S. Design Patents D453,593 and D445,965 to Licciardello depict a "mobile pet carrier" having a fixed mesh enclosure on a modified baby stroller frame.

All of these prior art devices are hard-sided making them incapable of being folded for easy, compact storage. There is a real need in the art for a device that is light, easily used, stored, and transported and which further provides a soft, comfortable environment for the pet. There is also a need for a low-cost, simple to use, alternative device which could easily be used to modify the pre-existing, easily accessible, inexpensive umbrella or similar baby stroller which has the same afore-mentioned pet containment benefits.

BRIEF SUMMARY OF THE INVENTION

The apparatus of the present invention is a pet stroller which comprises a stroller frame, soft-sided containment area, an optional overhead containment wall, an optional head access opening of the overhead containment wall, and an optional ventilated closure flap of the head access opening.

The stroller embodiment of the present invention comprises a soft-sided containment unit and a carriage, wherein the soft-sided containment unit itself comprises a base disposed on a lower end of the soft-sided containment unit, at least one side wall disposed in connected relation to the base and extending upwardly from the base to form an internal containment area, and an upper end with access means for insertion and removal of a pet; and wherein the carriage comprises a frame having at least two main side support bars, at least two secondary support bars disposed in connected relation to the main support bars thereby creating an intersection area, a wheel base area disposed on a lower end of the main support bars, and a handle disposed on the at least one main side support bar; wherein the soft-sided containment unit is disposed upon and supported by the carriage, and wherein the carriage is foldable about the intersection area.

In further embodiments, the mobile pet containment apparatus may additionally comprise an overhead containment wall disposed on the upper end which may be comprised of a flexible material, such as but not limited to fabric or mesh. The containment wall may additionally comprise attachment members disposed on at least one end of the containment wall. Such attachment members may be, for example, snaps, hooks and eyes, hooks and loops, ties, and buttons and holes.

The side walls of the containment unit may comprise of a soft material and may further comprise strengthening elements. The base may be comprised of a material selected from the group consisting of soft, rigid, or semi-rigid materials and may additionally comprise strengthening elements.

In further embodiments, the mobile pet containment unit's overhead containment wall may additionally comprise a head access opening which may further have a closure flap disposed on the containment wall for placement over the head access opening. The closure flap may comprise a material suitable for ventilation.

Alternately, the invention may comprise a stroller attachment containment unit comprising a soft-sided containment area, an optional overhead containment wall, an optional head access opening of the overhead containment wall, and an optional ventilated closure flap of the head access opening, and locking elements wherein the containment unit is disposable on and for use in combination with a pre-existing baby stroller. The locking elements may be selected from a member of the group consisting of ties, straps, and hooks, and may be disposed in connected relation to at least one member selected from the group consisting of a frame element of said pre-existing stroller, a seat of said pre-existing stroller, and a back of the pre-existing stroller. Further, the base of the containment unit may be comprised of a seat of the pre-existing stroller and/or one side wall of the unit may be comprised of a seat back of the pre-existing stroller.

A primary object of the present invention is to provide a soft-sided, convenient transporting method for use with pets.

A further object of the present invention is to provide a foldable, easily stored apparatus.

Another object of the present invention is to provide a unit which may be used in conjunction with a pre-existing stroller.

A further object of the invention is to provide a transport unit which will safely contain a pet, preferably while allowing the pet some freedom of viewing its surroundings.

A primary advantage of the present invention is its convenience in providing a light-weight, foldable stroller.

Another advantage of the present invention is the convenience of an apparatus that can be used to easily modify a pre-existing, low cost baby stroller for use with pets.

A further advantage of the present invention is the apparatus' soft-sided comfort provided to the pet.

Yet another advantage of the present invention is the safe containment of the pet.

Finally, another advantage of the present invention is the apparatus' access to allowing the pet to view its surroundings.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

Figure 1:
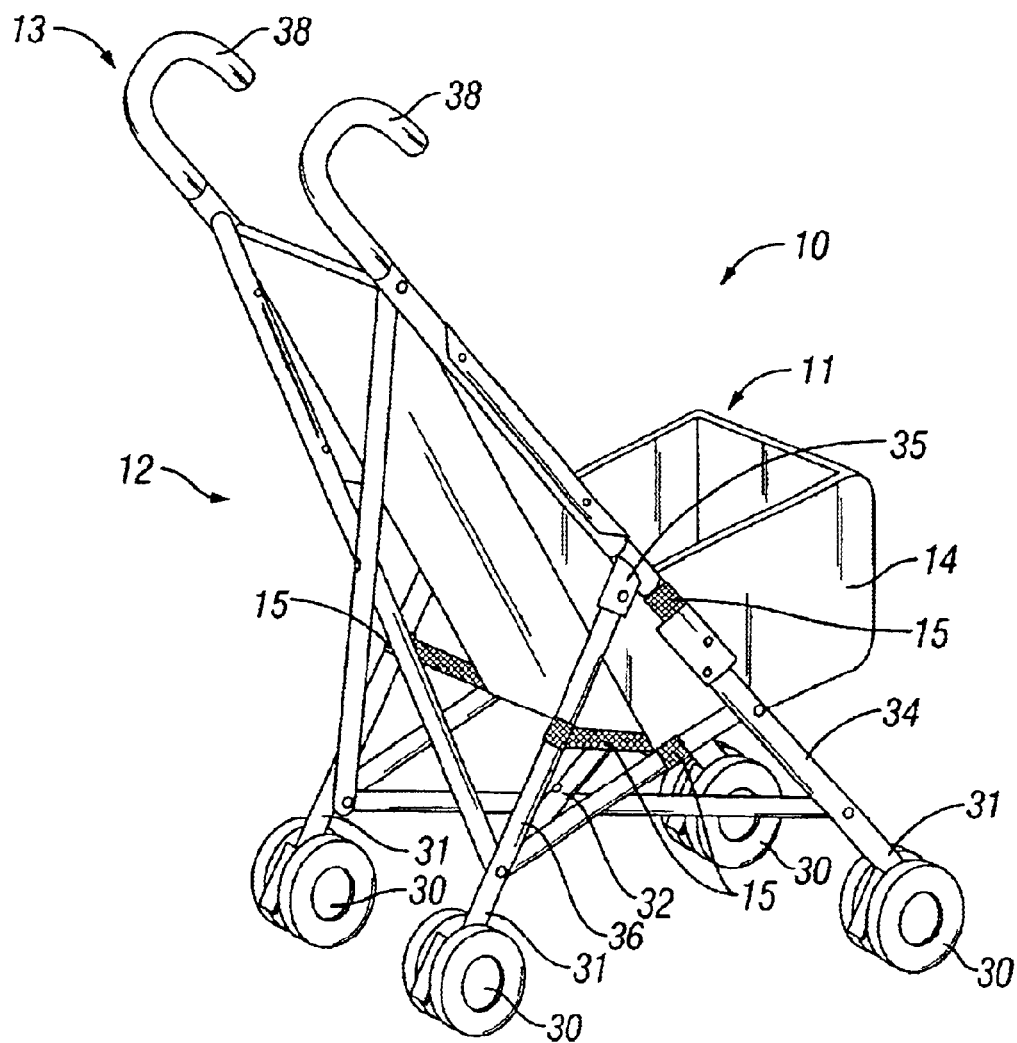
FIG. 1 is a perspective view of the stroller of the present invention, specifically depicting frame 12 and containment area 14.

Best Modes for Carrying Out the Invention

The apparatus of the present invention is a pet stroller 10 which comprises stroller frame 12, soft-sided containment area 14, optional overhead containment wall 16, optional head access opening 18 of overhead containment wall 16, and optional ventilated closure flap 20 of head access opening 18. Alternately, the invention may comprise a stroller attachment containment unit 11 comprising soft-sided containment area 14, optional overhead containment wall 16, optional head access opening 18 of overhead containment wall 16, and optional ventilated closure flap, not shown, of head access opening 18, wherein containment unit 11 is disposable on and for use in combination with pre-existing baby stroller 13.

In the preferred embodiment, as best depicted in FIG. 1, stroller frame 12 comprises the typical "baby stroller configuration" known in the art of strollers, wherein a preferably four (or more)-wheel base area 30 (although 2 and 3 wheel bases may be utilized) provides rolling support of and is disposed on lower end 31 of frame body 32 (which is preferably foldable for easy storage). Frame body 32 will preferably comprise at least two main side support bars 34, and at least two secondary support bars 36 disposed in connected relation thereto, as known in the art, which preferably intersect main support bars 34 along the length of main support bars 34 and are movably connected at such intersection 35 to allow a user to "fold" stroller 10 in a manner familiar in the art of baby strollers. At least one handle 38 will be disposed on at least one of main bars 34 or alternately on an optional bar or intersection of bars or disposed upon at least one of support bars 36. Additional support elements and other features known in baby strollers (e.g., cup holders, cargo trays, bag handles, etc.) may be comprised in stroller frame 12.

Figure 2:
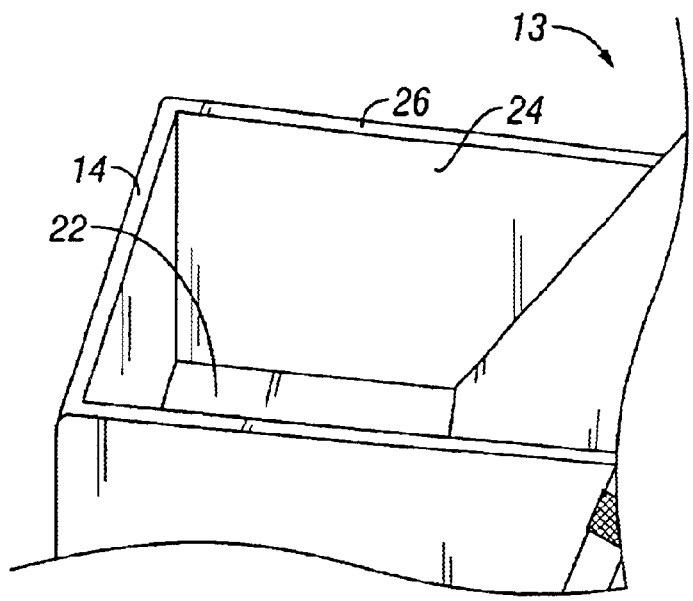
FIG. 2 is a perspective view of an alternate embodiment, depicting three side walls 24 of containment area 14, disposed on a pre-existing stroller.
Figure 3:
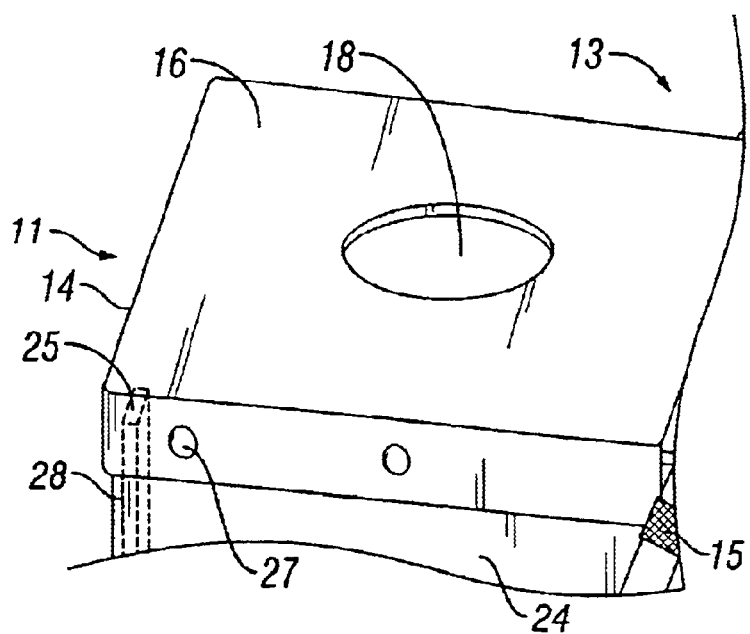
FIG. 3 is the embodiment as shown in FIG. 2, further depicting the optional overhead containment wall 16 with an optional head access opening 18 and strengthening elements 26.

As depicted in FIGS. 1–3, soft-sided containment area 14, generally comprises base 22 and preferably four contiguous side walls 24 disposed thereon or attached thereto. In the preferred embodiment, containment area's 14 upper end 26 is open, allowing the pet to sit within containment area 14 and maintain a relatively unobstructed view of the area outside of its containment area 14. In an alternate embodiment, more or less walls 24 may be utilized to produce a different polygonal configuration from the rectangular configuration of the preferred embodiment. Walls 24 may be permanently or removably disposed on base 22. Preferably, when walls 24 are removable from base 22, then walls 24 will be disposed in a connected linear relation to each other such that they have an end-to-end attachment area between at least two of the walls wherein the walls are secured to each other by conventional means, e.g., snaps, hooks and eyes, hooks and loops, ties, buttons and holes, etc., to form the desired upright three dimensional configuration.

In yet another alternate embodiment as best depicted in FIG. 3, upper end 26 additionally comprises overhead containment wall 16. Overhead containment wall 16 may fully or partially enclose the open area of upper end 26. Preferably, wall 16 is comprised of a flexible material (such as, but not limited to fabric) which can be easily rolled or otherwise bundled or moved out of the way when surface 26 is desired to be open. A more rigid surface material can be utilized to ensure adequate securing of wall 16 for more rambunctious pets. When wall 16 is desired to be used for additional containment of the pet, wall 16 is unbundled (or otherwise set in place), and is stretched over upper surface 26 and is attached to one or more, preferably at least two, side walls 24. Attachment is preferably achieved by use of a simple attachment means 27 known in the art, such as but not limited to snaps, hooks and eyes, hooks and loops, ties, buttons and holes, etc. Wall 16 may be permanently affixed to at least one side wall 24 and be stored proximately thereto. Alternately, wall 16 may be completely detachable from containment area 14.

Additional embodiments will further comprise head access opening 18 of overhead containment wall 16 as also depicted in FIG. 3, wherein a ventilation opening of suitable size for protrusion of the pet's head is formed in containment wall 16. Alternate embodiments will comprise a ventilated closure flap not shown, of head access opening 18. Preferably such closure comprises a "breathable" fabric or mesh for adequate ventilation. Closure flaps may be completely detachable from wall 16 or may be attached by sewing or other closure means such as but not limited to closure means suitable for fixing the flap in place, such as but not limited to hooks and loops, hooks and eyes, ties, buttons and holes, etc., on wall 16.

Contiguous walls 24 or base 22 may have semi-rigid or rigid strengthening elements 25 disposed on or within walls 24. Such elements are preferably disposed in corner areas 28 of containment area 14 where contiguous walls 24 intersect and under or within the base. For example, in a preferred embodiment, such a strengthening element would comprise a plastic rod or other more rigid material disposed vertically or horizontally along or within one or more walls 24, or for example, by reinforced stitching. Optionally, additional strengthening elements may be disposed along an upper surface of one or more of contiguous walls 24. It is preferred that any such elements be semi-rigid or foldable in a manner that comports with the folding action of the stroller body.

Base 22 as shown in FIG. 2 is preferably comprised of a soft material (such as, but not limited to fabric), or a rigid or semi-rigid material (such as, but not limited to plastic, wood, and laminated materials) which may have an optional padded surface. Side walls 24 are preferably comprised of a soft material (such as but not limited to fabric and mesh) or slightly less preferably, a semi-rigid material (such as but not limited to a flexible plastic resin or rubberized or foam-type material). Preferably, when a semi-rigid or rigid material is utilized, the surface will additionally comprise a padded layer. Also, it is preferred that when a soft material is used for either base 22 and/or side walls 24, that strengthening elements are used.

As depicted in FIGS. 2 and 3, alternate embodiments of the invention will additionally comprise stroller attachment containment unit 11 essentially comprising soft-sided containment area 14 of the invention disposed on a preexisting baby stroller. In the preferred embodiment, at least one of base 22 of containment unit 11 and/or a designated rear-facing side wall 24 of containment unit 11 will comprising locking elements 15 of unit 11 for attachment to pre-existing stroller 13. In such embodiments, additional locking elements will preferably be disposed on a lower end of at least two of side walls 24 for attachment to the pre-existing stroller seat. Alternately, base 22 or rear-facing side wall 24 may be omitted from containment area 14 and the pre-existing stroller seat 17 may be attached to walls 24 to serve as the unit's base and/or the seal back of the stroller may serve as the rear-facing side wall instead. Preferably locking elements include, but are not limited to snaps, hooks and eyes, hooks and loops, ties, buttons and holes, etc.

In an alternate embodiment, containment unit 11 may attach to preexisting stroller 13 by attachment of the unit to stroller frame 12 by conventional means, such as, but not limited to ties, straps (e.g., with conventional closure means on the straps such as but not limited to snaps, hooks and eyes, hooks and loops, buttons and holes, bungee cord tension, etc.), hooks, etc.

Although the invention has been described in detail with particular reference to these preferred embodiments, other embodiments can achieve the same results. Variations and modifications of the present invention will be obvious to those skilled in the art and it is intended to cover all such modifications and equivalents.

What is claimed is:

1. A mobile pet containment unit for a pet comprising:
    a stroller;
    an internal containment area comprising a base and unbroken, contiguous side walls extending upwardly from said base for containment of the pet;
    a top comprising at least one edge attached to said side walls in a continuous, unbroken manner and disposable on said internal containment area for enhancing containment of the pet, said top comprising an opening for insertion and removal of the pet;
    said top surrounding a neck of the pet and disposed atop shoulders of the pet with a head of the pet sticking out of said top opening when the pet sits or stands on said base; and
    at least one locking element for securing said internal containment area to said stroller.

2. The mobile pet containment unit of claim 1 wherein said top comprises a flexible material.

3. The mobile pet containment unit of claim 2 wherein said flexible material comprises at least one material selected from the group consisting of fabric and mesh.

4. The mobile pet containment unit of claim 1, wherein said side walls additionally comprise attachment members disposed on at least one end of said side walls.

5. The mobile pet containment unit of claim 4, wherein said attachment members comprise at least one member selected from the group consisting of snaps, hooks and eyes, hooks and loops, ties, and buttons and holes.

6. The mobile pet containment unit of claim 1 wherein said side walls comprise a soft material.

7. The mobile pet containment unit of claim 1 wherein said side walls additionally comprise at least one strengthening element.

8. The mobile pet containment unit of claim 1 wherein said base comprises at least one material selected from the group consisting of soft, rigid, and semi-rigid materials.

9. The mobile pet containment unit of claim 8 wherein said base additionally comprises at least one strengthening element.

10. The mobile pet containment unit of claim 1 wherein said locking element comprises at least one member selected from the group consisting of ties, straps, and hooks.

11. The mobile pet containment unit of claim 1 wherein said locking element is disposed in connected relation to at least one member selected from the group consisting of a frame element of said stroller, a seat of said stroller, and a back of said stroller.

12. The mobile pet containment unit of claim 1 wherein said base comprises a seat of said stroller.

13. The mobile pet containment unit of claim 1 wherein one of said side walls comprises a seat back of said stroller.

14. The mobile pet containment unit of claim 1 removable from said stroller.

15. The mobile pet containment unit of claim 1 wherein said at least one locking element is disposed on said base.

16. The mobile pet containment unit of claim 1 wherein said at least one locking element is disposed on at least one of said side walls.

17. The mobile pet containment unit of claim 1 wherein said at least one locking element is disposed on said base and on at least one of said side walls.

* * * * *